(12) United States Patent
Watanabe et al.

(10) Patent No.: US 7,099,596 B2
(45) Date of Patent: Aug. 29, 2006

(54) OPTICAL TRANSMITTER

(75) Inventors: Koichi Watanabe, Hachioji (JP); Ryoji Takeyari, Koganei (JP); Masataka Shirai, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 666 days.

(21) Appl. No.: 10/319,514

(22) Filed: Dec. 16, 2002

(65) Prior Publication Data

US 2003/0180054 A1     Sep. 25, 2003

(30) Foreign Application Priority Data

Mar. 20, 2002   (JP)   ............... 2002-077951

(51) Int. Cl.
*H04B 10/04*   (2006.01)

(52) U.S. Cl. ............ 398/183; 398/182; 398/186; 398/192; 398/193; 398/194; 398/195; 398/196; 398/197; 398/198; 372/29.01; 372/32; 372/34; 372/38; 372/36

(58) Field of Classification Search ........... 398/180, 398/182, 183, 186, 192, 193, 195, 196, 197, 398/198; 372/29.01, 34, 32, 38, 36
See application file for complete search history.

(56) References Cited

U.S. PATENT DOCUMENTS 4,237,427 A * 12/1980 Holland ............ 372/29.02
5,706,116 A *  1/1998 Sugata ................ 398/182

FOREIGN PATENT DOCUMENTS

JP       5-075438       3/1993
JP       9-181682       7/1997

* cited by examiner

*Primary Examiner*—Hanh Phan
(74) *Attorney, Agent, or Firm*—Antonelli, Terry, Stout and Kraus, LLP.

(57) ABSTRACT

A high-speed optical transmitter having an optical modulator and a driver circuit while maintaining optical modulator performance. The high-speed optical transmitter comprises the optical modulator which modulates and outputs an input light in accordance with an applied voltage, and a driver circuit which outputs the applied voltage into the optical modulator and has an emitter follower circuit at an output stage thereof.

4 Claims, 11 Drawing Sheets

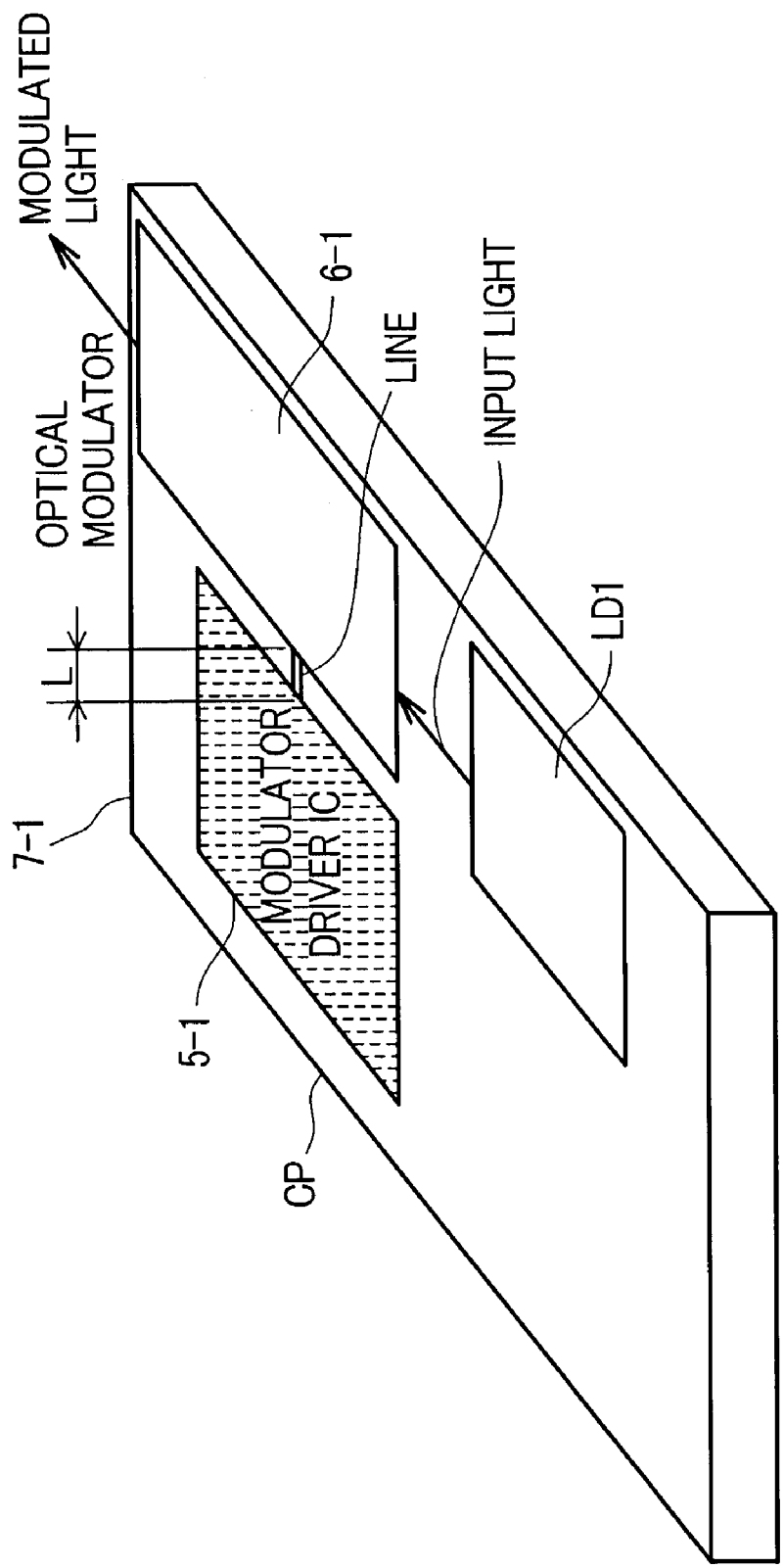

OPTICAL TRANSMITTER

BACKGROUND OF THE INVENTION

1. Field of the Invention

The present invention relates generally to an optical transmitter used for an optical fiber communication system, and in particular, to a driver circuit suitable for an electro-absorption optical modulator or a Mach-Zehnder optical modulator and an optical transmitter employing the driver circuit.

2. Description of the Related Art

In an optical fiber communication system, due to the large capacity of transmission lines, there is an urgent demand for increasing modulation rates. In direct intensity modulation by a laser diode, a relatively large wavelength chirping limits transmission distance and modulation rate. When light signals with chirping pass through an optical fiber having chromatic dispersion (wavelength dispersion), the waveform thereof is usually distorted.

In order to prevent this problem, there is a rising expectation for the use of an external optical modulator which hardly causes chirping. As a practical external optical modulator, a Mach-Zehnder optical modulator (MZ modulator) was developed. Carrier light having a constant intensity is supplied from a light source into the MZ modulator, and intensity-modulated light signals are obtained by switching operation using light interferences. For example, there have been reported MZ modulators using $LiNbO_3$ crystals or compound semiconductor crystals.

It has also been proposed that electroabsorption type optical modulators (EA type modulator) as external optical modulators, can be driven by lower electric power and are more suitable for size reduction than MZ modulators. The EA type modulator absorbs carrier light according to applied voltages thereby generating intensity-modulated light signals. For example, an EA type modulator using compound semiconductors has been reported.

A practical EA type modulator is provided as a semiconductor chip by semiconductor epitaxial technology. This EA type modulator can easily be integrated with a laser diode used as a carrier light source. Therefore, the reduction of coupling loss between the carrier light source and the modulator enables high-power output or miniaturization. For example, an EA-DFB laser semiconductor chip which is provided by monolithically integrating DFB-LD (distributed feedback-laser diode) with an EA type modulator, has been reported.

An optical transmitter comprising a general optical modulator and its driver circuit is described by referring to FIGS. 14 and 15. FIG. 14 is a view illustrating a circuit configuration of an optical transmitter comprising a modulator and its driver circuit, and FIG. 15 is an equivalent circuit diagram of the optical transmitter of FIG. 14.

As shown in FIG. 14, the optical transmitter X is composed of a driver circuit 100-1 which is surface-mounted in a first package, and an optical modulator (EA type modulator) 100-2 which is surface-mounted in a second package different from the first one.

The driver circuit 100-1 comprises two bipolar transistors 101-1 and 101-2 which are connected to one emitter, and respective load resistors 103-1 and 103-2, which are serially connected to the transistors. The emitter having the common connection is connected to a supply voltage VEE and current source 104-1 is provided between them. The load resistors 103-1 and 103-2 are grounded (GND). Data signals and inverted data signals are inputted into individual base terminals of two bipolar transistors 101-1 and 101-2, which act as differential amplifiers.

The optical modulator 100-2 has a p-n junction diode 102 and a resistor 110 formed by branching from the p-n junction diode 102. The differential amplifier has an output terminal 107-2 connected to an anode of the optical modulator 102, and output voltage (drive voltage) from the differential amplifier is applied to the anode of the optical modulator 102, so that input light is modulated and outputted.

In view of the foregoing, in an optical transmitter X, driver circuit 100-1 and optical modulator 100-2 are generally mounted in separate packages. There is provided a 50Ω connector 108 (Z) or a cable between the packages, and thus the driver circuit is connected to the modulator via a 50Ω line.

As described above, the optical modulator 100-2 and the driver circuit 100-1 for driving the modulator are separately packaged. As an output circuit (output stage) of the driver circuit 100-1 for the optical modulator 100-2, a collector output circuit in FIG. 14, and for example, described in JP Patent Publication (Unexamined Application) No. 11-14951 may be used. When the collector output circuit is used, the impedance matching is set at 50Ω.

As shown in FIG. 15, in the above circuit configuration, a low pass filter having a larger CR time constant is formed by a terminating resistance (R) and a capacitance (C) comprising a capacitance C12 of the EA type optical modulator 100-2 itself and other parasitic capacitances C11 such as wiring capacitance, and the CR time constant limits frequency band so as to interrupt signals of high frequencies.

In FIG. 15, for example, it is supposed that the capacitance C12 of the optical modulator is 0.5 pF and the capacitance C11 on the driver circuit side, including parasitic capacitance is 0.5 pF. Also, if the drive voltage for driving the optical modulator is 2V, and Z1 (103-2) and Z2 (110), both present in parallel, have a resistance of 50 Ω, substantial parasitic resistance is 25 Ω. Therefore, CR time constant is 25 ps. For this case, the maximum operating frequency (fm) has a limit of approximately 10 GHz. In other words, when operation is performed at a high speed (high frequency), the delay time required for signal switching between "0" and "1," that is rising edge/falling edge, becomes large, and thus it becomes unlikely for the optical transmitter to operate normally.

In the above circuit, the R value is fixed because 50 Ω matching is necessary. Therefore, C is required to be smaller to make CR time constant smaller. Although a smaller capacitance C12 of the optical modulator is necessary to make the capacitance C smaller, the drive voltage is made to be larger than 2V when the capacitance C12 of the optical modulator is smaller. Thus, there is a trade-off between the operating frequencies and drive voltage. A larger drive voltage increases the difficulty in the high-speed operation of the driver circuit.

In addition, a smaller capacitance C12 of the optical modulator limits the power of the modulator's output light. In optical communication systems if the power of the output light is small, an optical amplifier is necessary, and thus there are drawbacks, such as that the system as a whole becomes expensive.

SUMMARY OF THE INVENTION

It is an object of the invention to enhance operation speed of an optical transmitter in an optical fiber communication system.

According to one aspect of the present invention, there is provided an optical transmitter comprising: an optical modulator which modulates and outputs an input light in accordance with an applied drive voltage; and a driver circuit which outputs the drive voltage to the optical modulator and has an emitter follower circuit at an output stage of the driver circuit.

According to the optical transmitter, it is possible to design a faster optical modulator while maintaining a capacitance value.

According to another aspect of the present invention, there is provided an optical transmitter comprising: a substrate; an optical modulator formed in the substrate, which intensity-modulates and outputs an input light in accordance with an applied drive voltage; and a driver circuit formed in the substrate, which outputs the drive voltage to the optical modulator and has an emitter follower circuit at an output stage of the driver circuit.

According to the optical transmitter of the present invention, the driver circuit and the optical modulator are integrated onto one substrate, and therefore it is easy to reduce the length of the wiring between them.

This specification includes part or all of the contents as disclosed in the specification and/or drawings of Japanese Patent Application No. 2002-77951, which is a priority document of the present application.

BRIEF DESCRIPTION OF THE DRAWINGS

FIG. 4A is a plan view and FIG. 4B is a cross-sectional view taken on line IVBa–IVBb of FIG. 4A.

FIG. 6A is a plan view and FIG. 6B is a cross-sectional view taken on line VIBa–VIBb of FIG. 6A.

FIG. 8 is a perspective view illustrating an optical transmitter according to a third embodiment of the present invention.

DETAILED DESCRIPTION OF THE PREFERRED EMBODIMENTS

In the present specification, the term "emitter follower circuit" is used, on the precondition that a bipolar transistor is used as a switching element. However, when a field effect transistor (FET) is employed, a source follower circuit may be used instead. Therefore, in the present specification, the term "emitter follower circuit," also includes a source follower circuit. A circuit wherein a source follower circuit is used at an output stage is thus also within the scope of the present invention.

Figure 14:
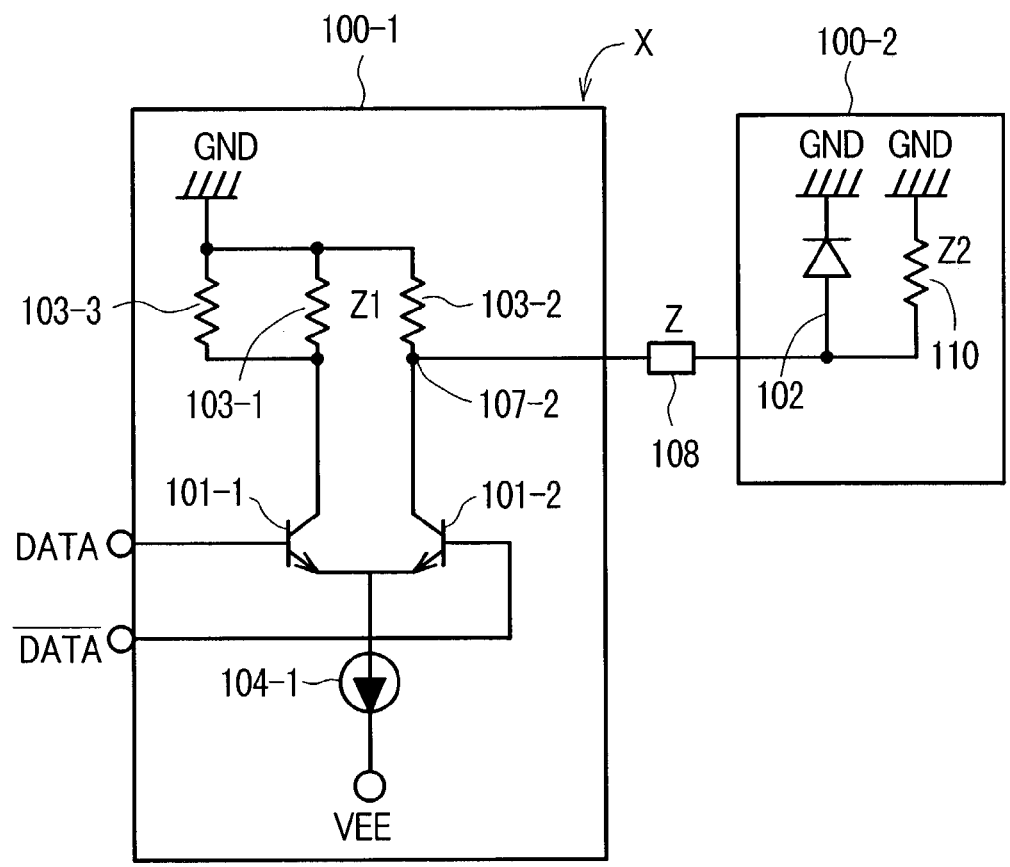
FIG. 14 is a view illustrating an example of a circuit diagram of a general optical transmitter.
Figure 15:
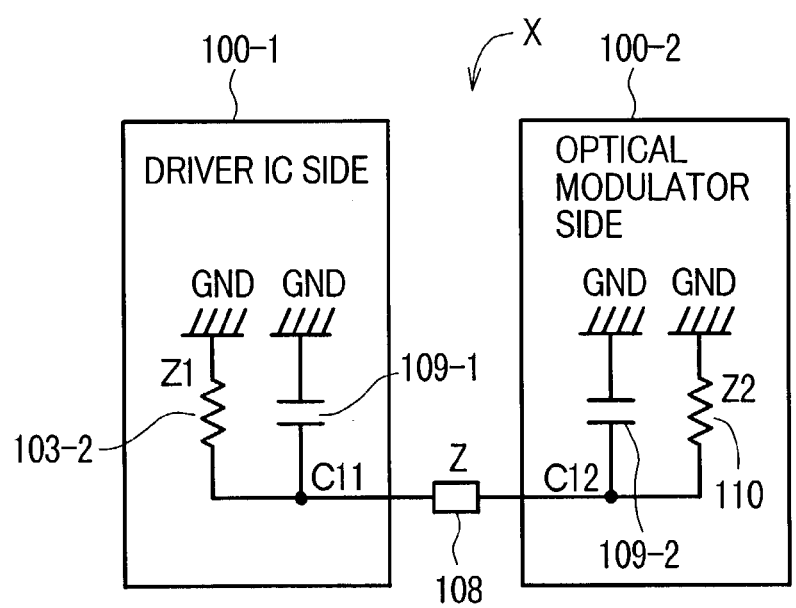
FIG. 15 is a schematic view illustrating an equivalent circuit diagram of the circuit in FIG. 14.

Considerations which the present inventors have made are described before the description of the embodiments of the present invention. The present inventors have found that a smaller capacitance of the optical modulator deteriorates optical modulator performance. Because of this, there is a limit to the performance enhancement by the driver circuit having the configuration as shown in FIG. 14, wherein the maximum operating frequency fm is limited by CR time constant τ. In other words, the maximum operating frequency is calculated by the equation "$fm = 1/2\pi\tau = 1/2\pi CR$ ($\tau = CR$)." Thus, when C is not allowed to be much small because optical modulator performance concerns, the maximum operating frequency fm is limited by CR time constant.

The present inventors have conceived the circuit configuration to obtain high-speed performance while maintaining a certain level of capacitance (C12) of the optical modulator. First, instead of the above circuit having limited operating frequencies due to the CR time constant, a circuit having a new drive system is used. This new circuit configuration is described with reference to FIG. 2. This is shown as an example using an EA(Electroabsorption) type optical modulator as an optical modulator. The EA type optical modulator generates intensity-modulated light signals by adjusting absorbance of carrier light in accordance with applied voltage (drive voltage).

Figure 2:
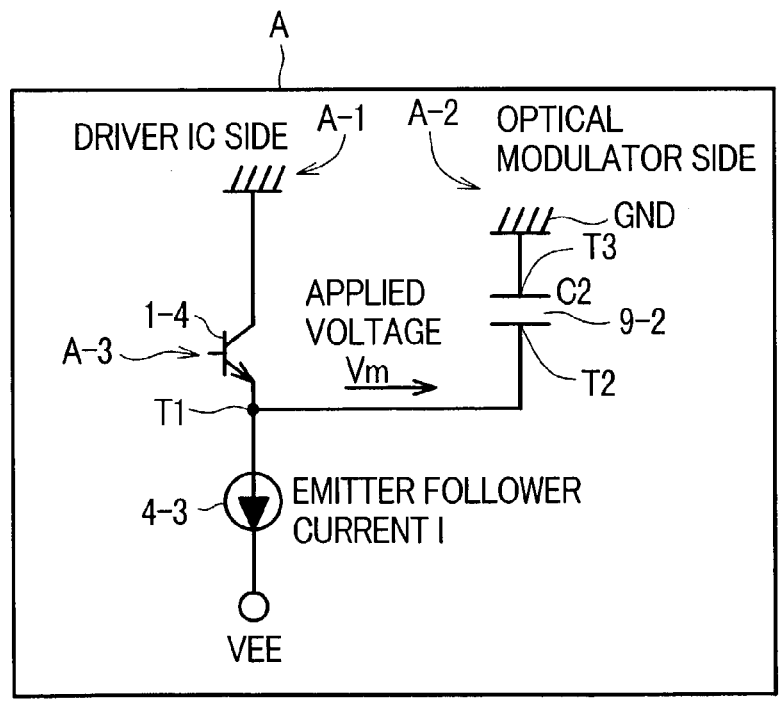
FIG. 2 is a schematic view illustrating an equivalent circuit of the circuit in FIG. 1.

FIG. 2 is a schematic view of an equivalent circuit illustrating a part of the circuit configuration of the optical transmitter as invented by the present inventors. As shown in FIG. 2, an optical transmitter A includes an emitter follower circuit A-3 which is an output stage(output circuit) on the side of the driver circuit A-1, and an EA type modulator on the side of the optical modulator A-2 (herein, only a capacitance C2(9-2) is shown).

The emitter follower circuit A-3 has, for example, a bipolar transistor 1-4 and a current source 4-3. The bipolar transistor 1-4 has an output terminal T1, on the emitter side, connected to a voltage input terminal T2 of the EA type optical modulator 9-2. The voltage input terminal T2 of the EA type optical modulator 9-2 has other terminal T3 grounded (GND). In this case, the emitter follower circuit A-3 applies a drive voltage Vm to the voltage input terminal T2 of the EA type optical modulator 9-2.

In the above optical transmitter A, a delay time $\tau_1$ is basically determined by current I flowing to the emitter follower and the capacitance C2 of the EA type optical modulator 9-2. Namely, it is represented by the equation: C2×V=Q=Iτ$_1$. Therefore, without making the capacitance C2 of the EA type optical modulator 9-2 smaller, the delay time τ$_1$ can be reduced inversely with the magnitude of the current I flowing to the emitter follower. When the emitter follower circuit is used for the output circuit (output stage) of the driver circuit, the optical transmitter is unlikely to have limits on high-speed performance due to CR time constant.

As mentioned above, when the emitter follower circuit is arranged at the output circuit (output stage) of the driver circuit, the delay time (maximum operating frequency) is determined by the current I flowing to the emitter follower circuit, and the charge-and-discharge time of capacitance C of the optical modulator. Thus, greater magnitudes of current to the emitter follower can enable high speed performance. For this case, terminating resistance, which is usually used on the optical modulator side, is not necessary.

In particular, the distance between the driver circuit and the optical modulator is preferably not longer than the distance in which the driver circuit and the optical modulator are handled in a lumped constant manner in terms of the maximum operating frequency fm of the optical transmitter. When a high frequency signal is not affected by the length between the driver circuit and the optical modulator, multiple reflections can be prevented and circuit design is possible without having to deal with the 50Ω impedance matching. In this type of circuit, a driver system having a CR time constant limit is replaced with an impedance driver dissolved having a low capacitance. The limit for high-speed performance is by replacing with the current flowing to the emitter follower and the charge-and-discharge time of capacitance by the optical modulator. Therefore larger magnitudes of current to the emitter follower enhance operation speed. In this case, terminating resistance which is usually used on the optical modulator side is not necessary.

More particularly, the length L regarded as a lumped constant is shorter than the wavelength λ of an electric signal (electromagnetic wave) obtained from the maximum operating frequency fm of the optical transmitter, and more preferably substantially shorter than the wavelength λ obtained from fm. This length L is more specifically explained hereinafter.

λ and C are represented by the following equations: λ=c/f; and $C=(\mu_0 \in_0)^{-0.5}$. Herein, λ denotes a wavelength, f frequency, and C capacitance. $\mu_0$ denotes space permeability and it is 1.256×10$^{-6}$(H/m). $\mu \in_0$ denotes dielectric constant and it is 8.85×10$^{-12}$(F/m). The speed of light c is 2.998×10$^8$(m/s).

For example, if the operating frequency f is 10 GHz, the wavelength λ is approximately 3 cm. If the operating frequency f is 40 GHz, the wavelength λ is approximately 7.5 mm. When the dielectric constant is different, the above equation should be divided by the square root of the specific inductive capacity $\in_s$. The practical length L is preferably shorter than the wavelength λ obtained by the above equation. For example, the length is preferably one-third of λ, more preferably less than or equal to one-tenth of λ.

The specific inductive capacity $\in_s$ is determined by a peripheral material of the wiring which connects an output end of the emitter follower circuit and a voltage input terminal of the EA type optical modulator. For example, when an element is formed on an InP substrate and Au is used for wiring, nearly average values (this may be varied more or less depending on wiring shape) between the specific inductive capacity values of an InP layer (specific inductive capacity: $\in_s$=12.1) wherein there is an electric field leak, and the an air layer (specific inductive capacity: $\in_s$=1) are effectual specific inductive capacity.

Figure 1:
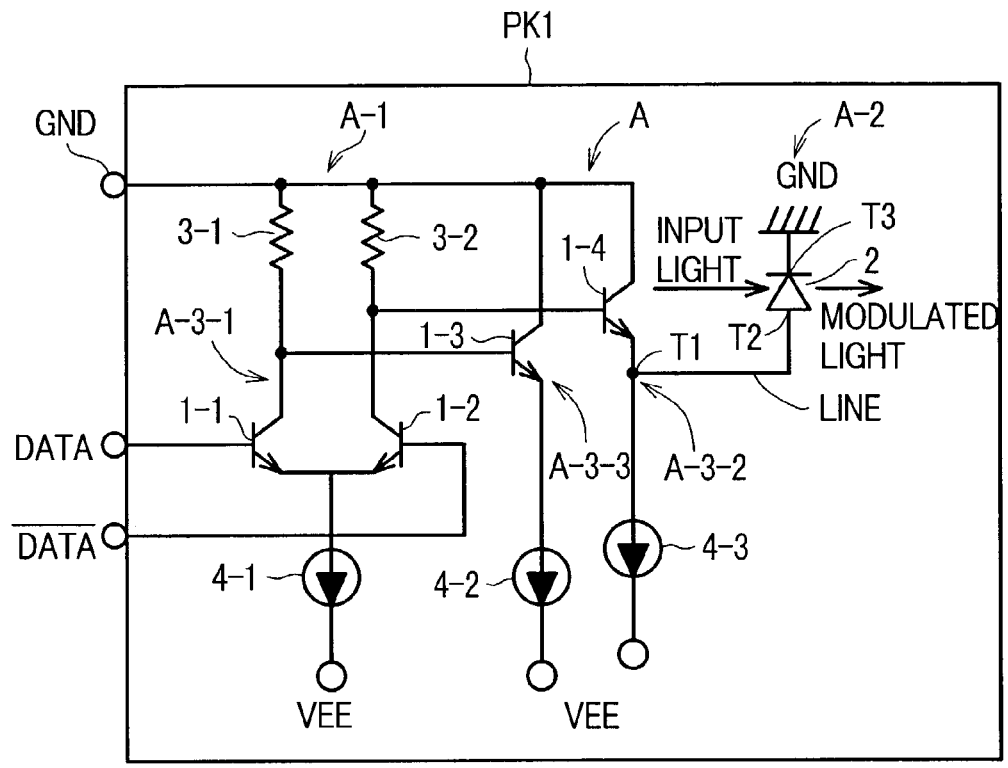
FIG. 1 is a circuit diagram of an optical transmitter according to a first embodiment of the present invention.
Figure 3:
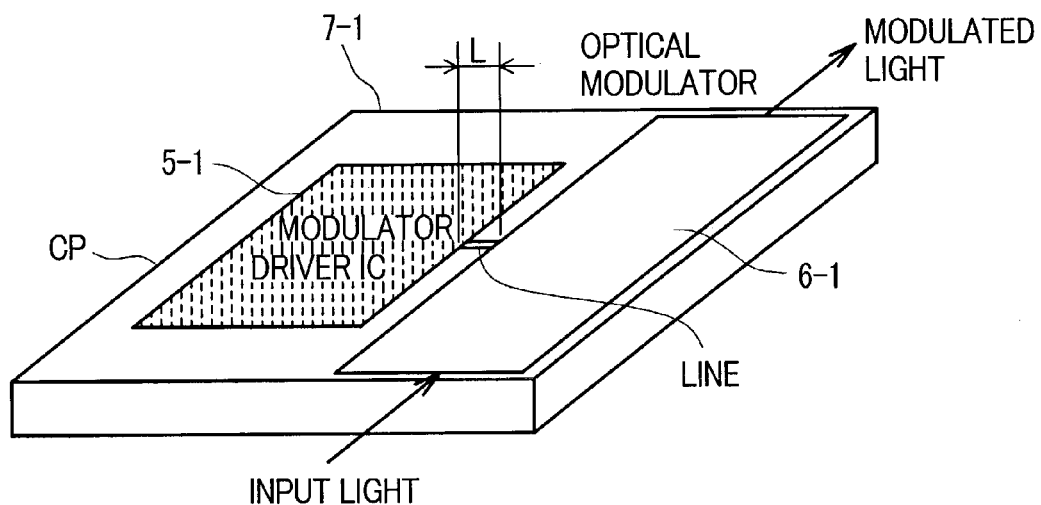
FIG. 3 is a perspective view of the optical transmitter according to the first embodiment of the present invention.
Figure 4A:
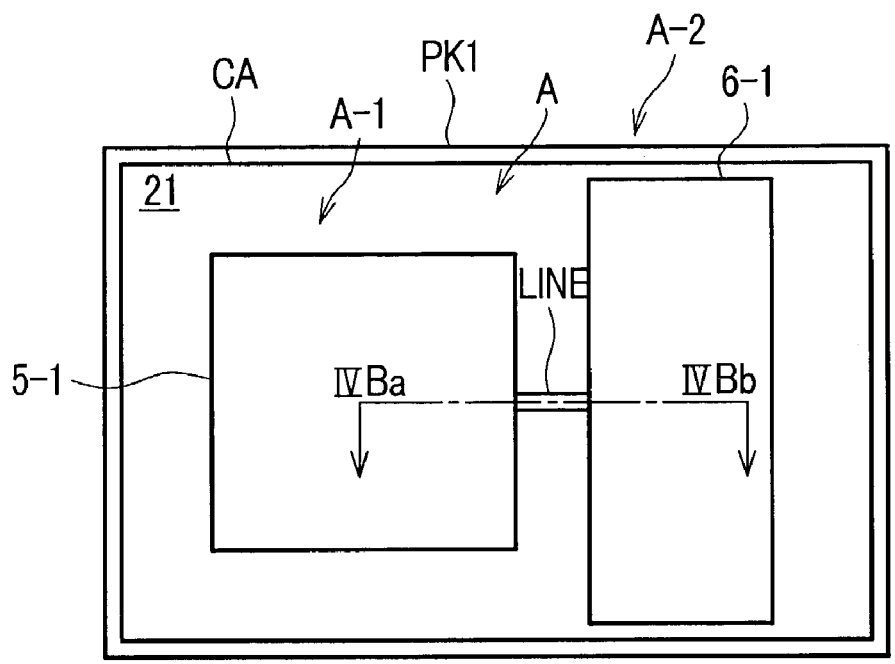
FIGS. 4A and 4B illustrate a structure of the optical transmitter according to the first embodiment of the present invention.
Figure 4B:
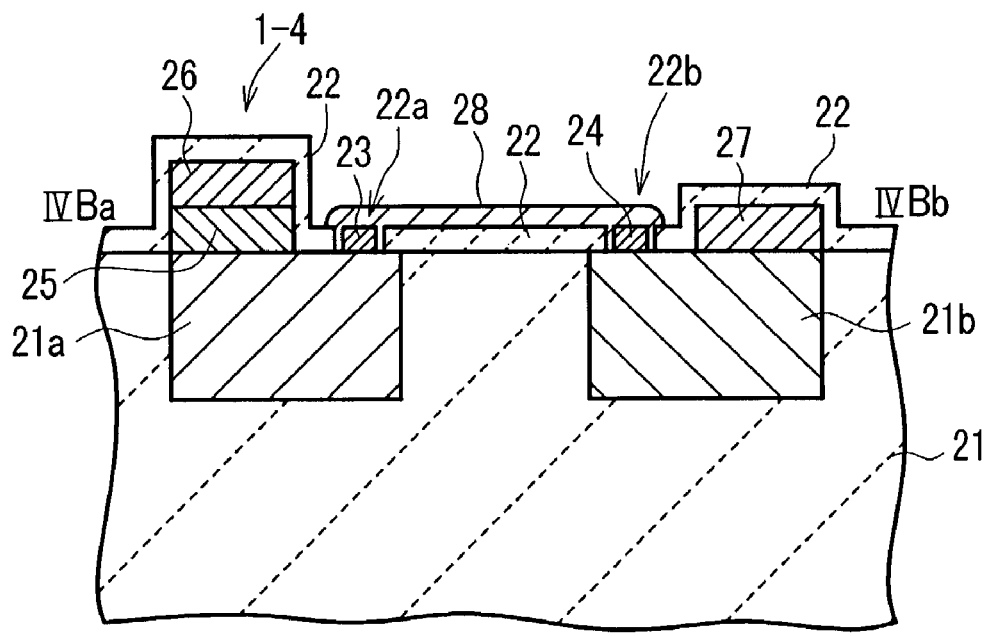

Based on the above considerations, the optical transmitter according to the first embodiment of the present invention will be described with reference to FIGS. 1 to 4. FIG. 1 is a circuit diagram of the optical transmitter according to the first embodiment of the present invention, and an output stage thereof is represented by an equivalent circuit in FIG. 2. FIG. 3 is a perspective view illustrating a structure of the optical transmitter according to the first embodiment of the present invention. FIG. 4A is a schematic plan view and FIG. 4B is a cross-sectional view take on line IVBa–IVBb of FIG. 4A.

As shown in FIG. 1, package PK1 has an integrated optical transmitter A having a driver circuit A-1 and an optical modulator A-2.

The driver circuit A-1 has a differential amplifier A-3-1, a first emitter follower circuit A-3-2 connected to the differential output terminal thereof, and a second emitter follower circuit A-3-3 connected to an inverted output terminal. The differential amplifier contains two bipolar transistors 1-1 and 1-2, which are commonly connected to an emitter, and load resistors 3-1 and 3-2, each of which is serially connected to each transistor. The commonly connected emitter is connected to a source voltage VEE, and between them a current source 4-1 (e.g., a bipolar transistor wherein an emitter is connected to a base) is provided. Opposite terminals of the load resistors 3-1 and 3-2 to the bipolar transistors 1-1 and 1-2 are grounded. Two bipolar transistors 1-1 and 1-2 each have a base terminal to which a DATA signal and an inverted DATA signal thereof are inputted.

The first emitter follower circuit A-3-2 has a transistor 1-4 and a current source 4-3 both serially connected with each other, and the second emitter follower circuit A-3-3 has a transistor 1-3 and a current source 4-2 both serially connected with each other. The transistor 1-4 has a base to which a differential output signal of the differential amplifier A-3-1 is inputted and the transistor 1-3 has a base to which an inverted differential output signal of the differential amplifier A-3-1 is inputted. Opposite terminals of the current sources 4-3 and 4-2 to the transistors are each connected to source voltages VEE. The transistors 1-3 and 1-4 of both emitter follower circuits are grounded on the collector side.

In the above driver circuit A-1, an output voltage is determined by current flowing to transistors 1-1 and 1-2, and resistances 3-1 and 3-2, and the determined output voltage is applied to the bases of transistors 1-3 and 1-4. The transistors 1-3 and 1-4 each have grounded collectors, that is, an emitter follower type. An electroabsorption type of optical modulator 2 is driven by the driver circuit A-1 employing this emitter follower as output circuit.

In FIG. 1, the first emitter follower circuit. A-3-2 constitutes an output stage of the driver circuit A-1 by connecting to an output of the differential amplifier. The output terminal T1 is connected to a terminal T2 on the anode side of the EA type optical modulator 2 by wiring LINE. Terminal T3 on the cathode side of EA type optical modulator 2 is grounded (GND).

With reference to FIGS. 3, 4A, and 4B, the configuration of the optical transmitter according to the present embodiment is described in detail.

As shown in these figures, the optical transmitter A of the present embodiment is accommodated in the package PK1 in the form of one chip CP. The optical transmitter A comprises an EA type optical modulator 6-1 and a driver circuit 5-1 for applying a preset drive voltage to an anode thereof. As described above, the output terminal on the output stage of the driver circuit 5-1 is connected to the input terminal of the optical modulator 6-1 by a wiring LINE having length L.

As shown in FIG. 4B, the optical transmitter A of the present embodiment, for example, is formed on an InP substrate 21. Formed inside the semi-insulating InP substrate 21, are an n-type impurity diffusion layer 21a and adjacent to this, a p-type impurity diffusion layer 21b. The n-type and p-type impurity diffusion layers 21a and 21b can be formed, for example, by an ion injection method. Alternatively, an opening to expose this impurity diffusion layer formation area may be formed using one mask, and for example, these impurity diffusion layers may be formed using a method wherein each n-type and p-type semiconductor layers are formed on the exposed InP substrate 21 through the opening by selective area growth. When the one mask is used for the formation of both n-type and p-type impurity diffusion layers 21a and 21b, registering process is not necessary. Thus, the distance between both impurity diffusion layers can be set up almost as one determined according to mask design. In particular, the selective area growth process is effective for shortening the distance between them.

The p-type semiconductor layer 25 (base layer) and n-type semiconductor layer 26 (collector layer) are laminated in this order onto the n-type impurity diffusion layer 21a (emitter layer), that is, an npn-type bipolar transistor is formed as the transistor 1-4 of the emitter follower circuit.

In contrast, n-type semiconductor layer 27 (cathode layer) is formed on the p-type impurity diffusion layer 21b (anode layer), and in other words an EA type optical modulator 6-1 having a PN junction is formed.

An insulating film 22 made of, for example, silicon nitride is formed so as to cover the transistor 1-4 of the emitter follower circuit and EA type optical modulator 6-1. An opening 22a to open a portion of the surface area of the n-type semiconductor layer 25 and an opening 22b to open a portion of surface area of the p-type semiconductor layer 26 are formed in the insulating film 22, and first and second electrodes 23 and 24 are formed in the openings 22a and 22b respectively. Between these electrodes 23 and 24, a wiring layer 28 (wire LINE in FIG. 4A) made of Au is formed on the insulating film 22. Thus, the emitter layer (21a) of the bipolar transistor at the output stage of the driver circuit is connected to the anode layer (21b) of the EA type optical modulator 6-1.

According to the first embodiment of the present invention, the optical transmitter employs the emitter follower as an output circuit, and thereby output impedance can be lowered. That is, a driver system having a CR time constant limit is replaced with an impedance driver system having a low capacitance by providing the emitter follower circuit 1-4 at output stage of the driver circuit A-1.

The operating frequency is determined based on the charge-and-discharge time of the capacitance C of the optical modulator by current I flowing to an emitter follower, and thus the maximum operating frequency can be raised by adjusting the current I flowing to the emitter follower circuit 1-4. In this case, the driver circuit A-1 and the optical modulator A-2 are preferably arranged so as to have a distance therebetween, which can be regarded as a lumped constant even at the maximum operating frequency.

It is noted that the bipolar transistor is used as a transistor in FIG. 1, though, for example, a field effect transistor such as a high electron mobility transistor (HEMT), may be used for constituting the optical transmitter in the same manner.

As described above, when the operating frequency is limited by the CR time constant (FIG. 14), the CR time constant is, for example, 25 ps.

In the case of the optical transmitter of the present embodiment, the electric charge Q, which is determined by the capacitance and the drive voltage of optical modulator, is represented by the equation: C×V=1 pC. For example, when the current (I=50 mA) flows to the emitter follower, the time constant is 20 ps. When the current (I=100 mA) flows to the emitter follower, the time constant is 10 ps. Likewise, larger magnitudes of current I flowing to the emitter follower enable the time constant to the capacitance value to become smaller. This allows an optical transmitter to perform high-speed operations.

According to one embodiment of the present invention, it is possible to normally operate the optical transmitter even when the operating frequency of the optical transmitter is increased. In addition, even when the capacitance C of the EA type optical modulator is kept large, the optical transmitter can maintain high-speed performance. Therefore, it is also possible to lower the drive voltage of the optical modulator at the same operating frequency, or to increase the output power of the optical modulator.

The wiring between the optical modulator (EA type optical modulator) and the driver circuit can be decreased by forming them on the same substrate, thus enabling high-speed performance of the optical transmitter. Also, the integration onto one chip enables size reduction of the chip itself.

Although exemplified above is the optical transmitter of the present embodiment wherein a common terminal on the collector side of the differential amplifier A-3-1 and a terminal on the collector side of the emitter follower circuits A-3-2 and A-3-3 were all grounded (GND), a preset voltage can commonly be applied to both. Alternatively, the configuration of the differential amplifier and emitter follower circuit may be provided for in order to apply different voltages to both of these.

Next, an optical transmitter according to a second embodiment of the present invention is described with reference to FIGS. 5, 6A and 6B, and if necessary, also to FIG. 1.

Figure 5:
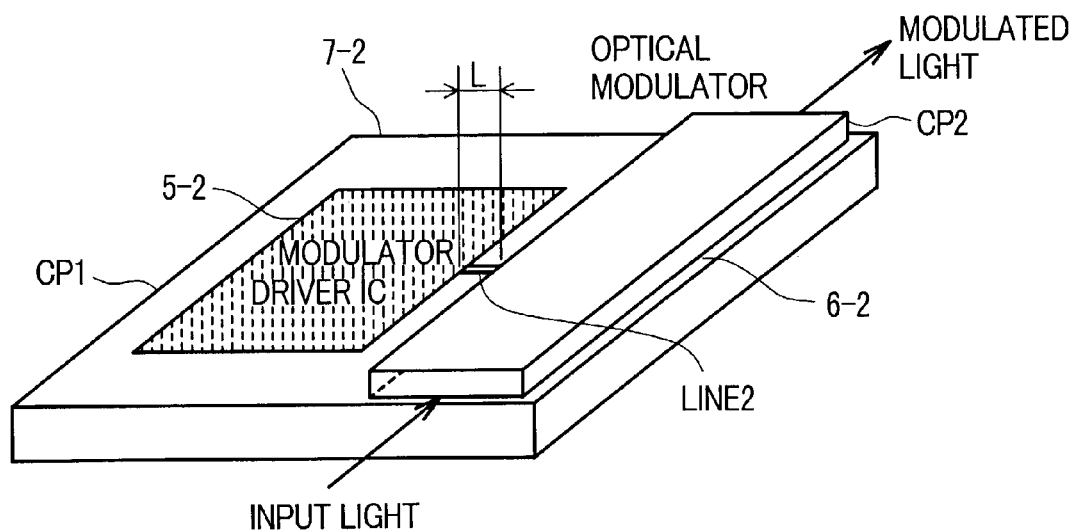
FIG. 5 is a perspective view illustrating an optical transmitter according to a second embodiment of the present invention.
Figure 6A:
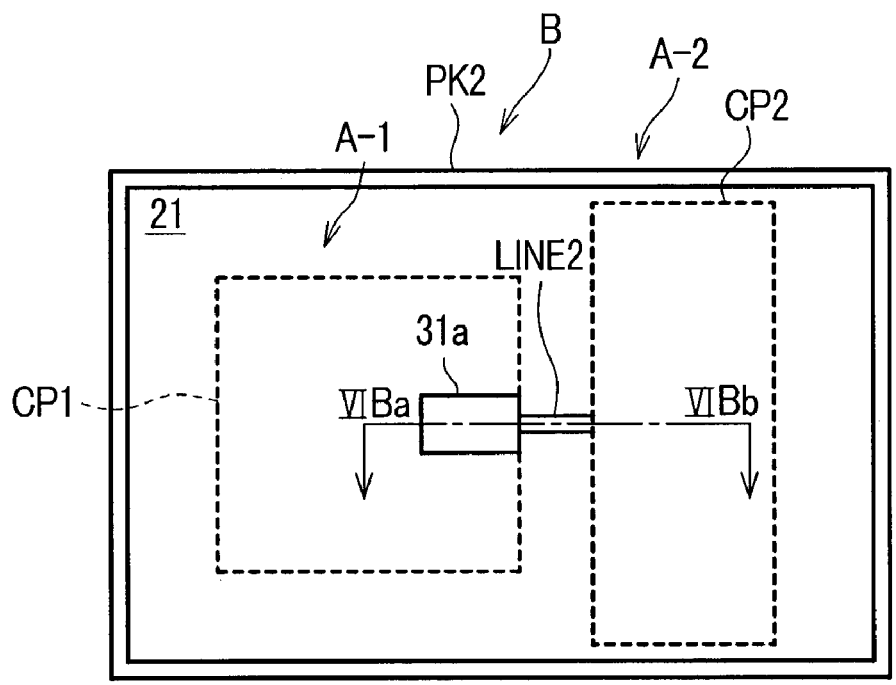
FIGS. 6A and 6B illustrate a structure of the optical transmitter according to the second embodiment of the present invention.

As shown in FIGS. 5 and 6A, the optical transmitter of the present embodiment has a first chip CP1 on which a driver circuit 5-2 is formed, and a second chip CP2 formed on the first chip CP1, the second chip CP2 having an EA type optical modulator 6-2 formed thereon. An output terminal at output stage of the driver circuit 5-2 is connected to an input terminal of the optical modulator 6-2 via a wiring LINE 2.

Figure 6B:
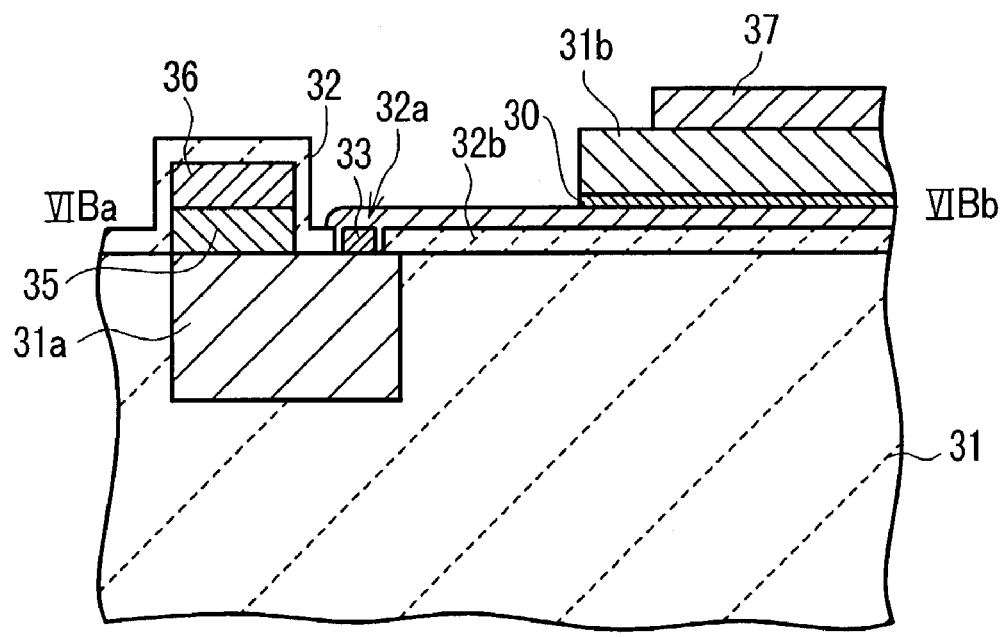

As shown in FIG. 6B, the optical transmitter B of the present embodiment, for example, is formed in an InP substrate 31. In the semi-insulating InP substrate 31, an n-type impurity diffusion layer 21a is formed. Adjacent to this n-type impurity diffusion layer 21a, mounted on the InP substrate 31 is an EA type optical modulator chip which has a lamination structure of a p-type InP substrate 31b and an n-type conductive layer 37.

More specifically, a p-type semiconductor layer 35 (base layer) and an n-type semiconductor layer 36 (collector layer) are laminated in order on the n-type impurity diffusion layer 31a (emitter layer), and that is an npn-type bipolar transistor is formed as a transistor 1-4 of the emitter follower circuit.

In contrast, an n-type semiconductor layer 37 (cathode layer) is formed on the p-type InP substrate 31b (anode layer), and that is, an EA type optical modulator 6-1 having a PN junction is formed.

An insulating film 32 made of, for example, silicon nitride is formed so as to cover the transistor 1-4 of the emitter follower circuit. An opening 32a to open a portion of the surface area of the n-type semiconductor layer 35 is formed in the insulating film 32, and a third electrode 33 is formed in the opening 32a. A wiring layer 32b (wiring LINE 2 in FIG. 6A) made of Au is formed on the insulating film 32 from the third electrode 33 toward the EA type optical modulator. A bottom surface of the p-type InP substrate 31b (anode layer) is electrically connected to an upper surface of the wiring layer 32b, for example, by solder bump 30.

According to the above structure, the emitter layer (31a) of the bipolar transistor at output stage of the driver circuit is connected to the anode layer (31b) of the EA type optical modulator 6-2.

Operations of the optical transmitter of the second embodiment are the same as those of the first embodiment.

Next, before describing an optical transmitter of a third embodiment of the present invention, a second consideration by the present inventors is described with reference to FIG. 16.

Figure 16:
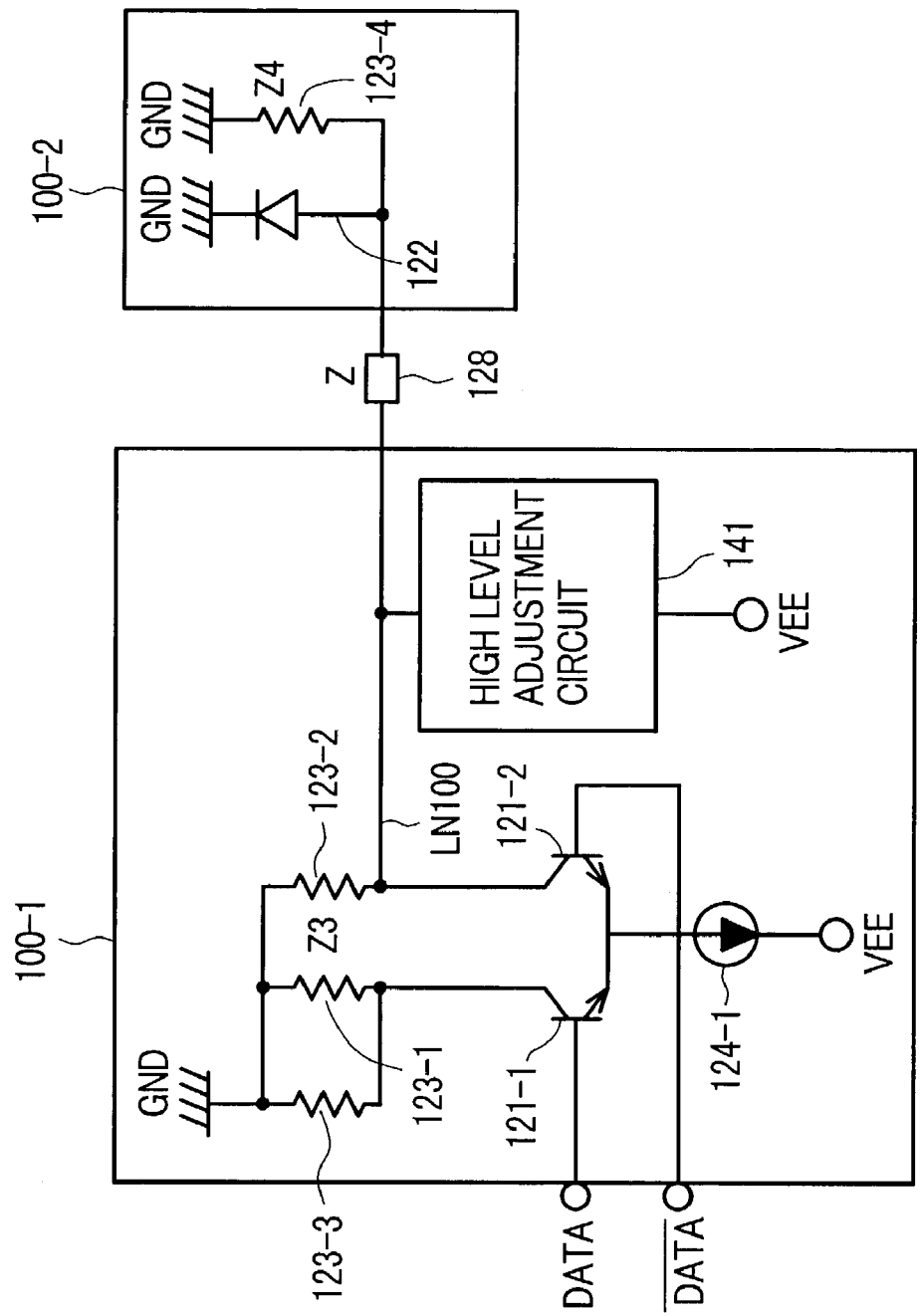
FIG. 16 is a circuit diagram having a configuration wherein a high-level adjustment circuit is added to the circuit of FIG. 14.

The optical transmitter as shown in FIG. 16 has a high level adjustment circuit provided between an optical modulator and a driver circuit, in addition to the optical transmitter as shown in FIG. 14.

As shown in FIG. 16, the level adjustment circuit 141 is provided on the way of the way of a wiring LINE 100 between a driver circuit 100-1 and an optical modulator 100-2 (between an output terminal at the output circuit of driver circuit 100-1 and an input terminal of the optical modulator 100-2). High level adjustment can be performed by making more current flow towards the level adjustment circuit 141. However, when the level adjustment circuit 141 is provided, parasitic capacitance increase, thereby causing a drawback, that is lowering the maximum operating frequency fm.

Hence, the present inventors devised an optical transmitter with a level adjustment function, which enables high-level adjustment without the provision of a level adjustment circuit between an output terminal at the output stage of a driver circuit and an input terminal of an optical transmitter. The optical transmitter with a level adjustment function according to an embodiment of the present invention is described with reference to FIG. 7A.

Figure 7A:
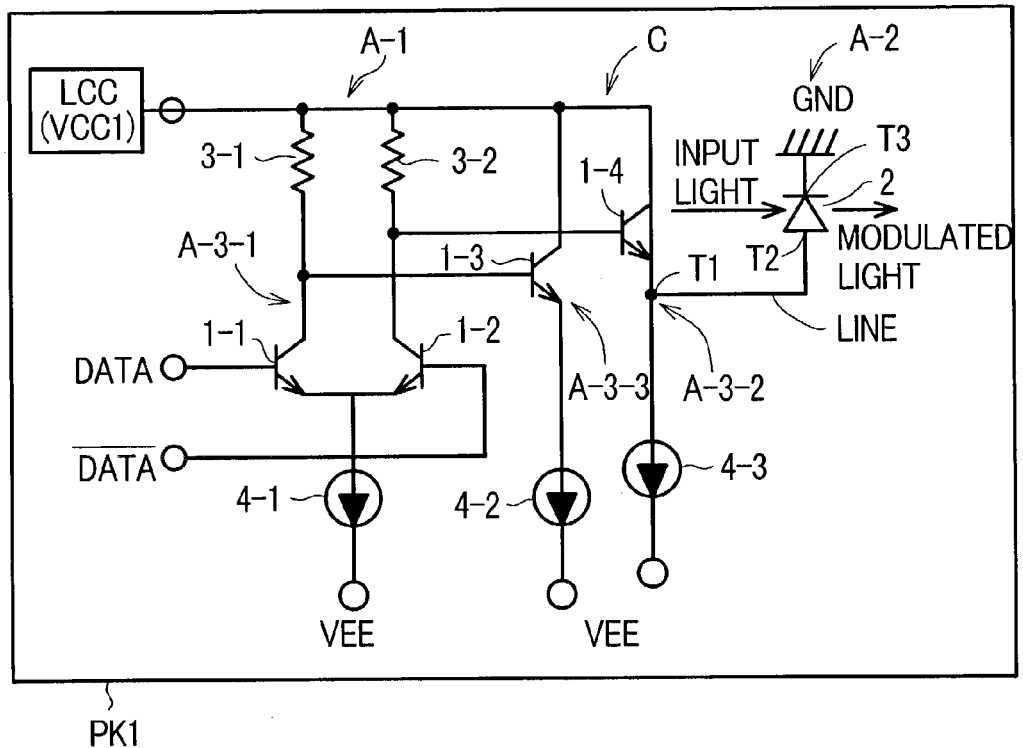
FIG. 7A is a circuit diagram of the optical transmitter according to the first embodiment of the present invention.

As shown in FIG. 7A, the optical transmitter C with a level adjustment function basically has the same configuration as the optical transmitter of the first embodiment as shown in FIG. 1. Namely, the optical transmitter C is a circuit having an emitter follower circuit as an output stage of a driver circuit for driving an optical modulator.

The difference between the optical transmitters described in FIG. 7A and FIG. 1 is that a voltage generating circuit LCC which can apply a desired voltage is provided to a common collector terminal of a differential amplifier A-3-1. The voltage VCC1 applied to the common collector terminal by the voltage generating circuit LCC is variable, and thus it is possible to adjust the voltage applied between the common collector terminal of differential amplifier A-3-1 and VEE. This enables the high-level adjustment of the driver circuit A-1. According to this configuration, since the capacitance between output terminal T1 of the emitter follower circuits A-3-2, and the voltage input terminal T2 of the optical modulator 2 is not increased, operation rate is hardly affected.

Figure 7B:
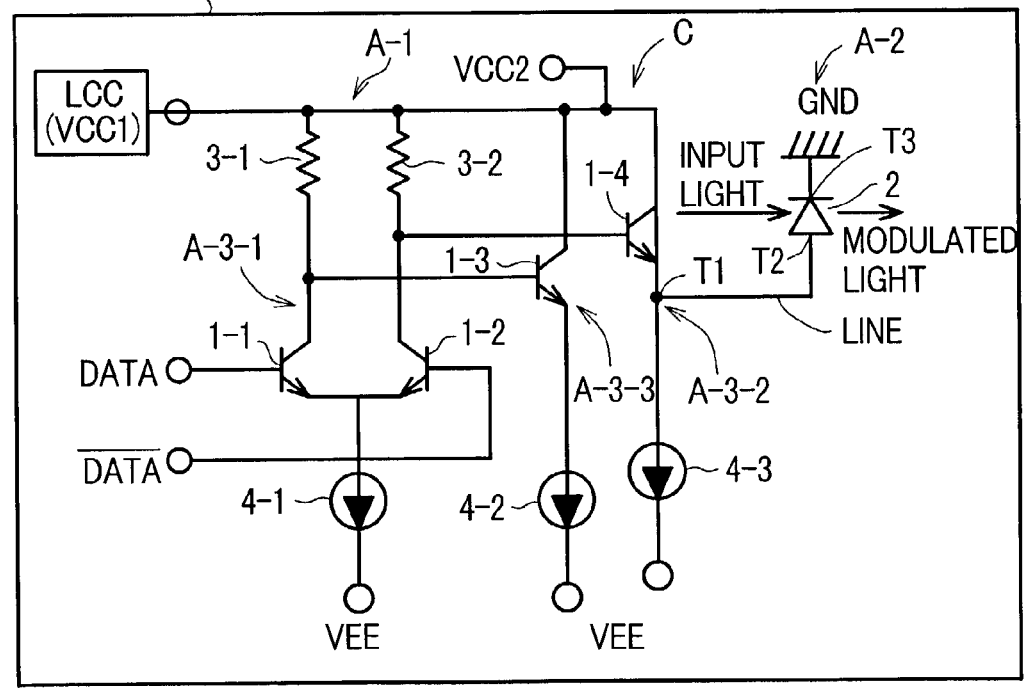
FIG. 7B is a circuit diagram illustrating a modification of FIG. 7A.

It is noted that, as shown in FIG. 7B, voltage VCC2, other than VCC1 which is provided from the LCC on the collector terminal side of the emitter follower circuit, can be provided.

When the circuit is configured to have the voltage VCC2 and not the voltage VCC1, it is possible to reduce VCE (voltage between collector and emitter) to some extent and to fully exploit the transistor performance of transistors 1-3 and 1-4 as the emitter follower.

Next, an optical transmitter according to a fourth embodiment of the present invention is described with reference to FIGS. 8 to 10. FIG. 8 corresponds to FIG. 3, and in addition to the optical transmitter shown in FIG. 3, it has configuration of integrating further a laser diode LD1 which emits carrier light on one chip CP, as well as the optical modulator 6-1 and the driver circuit 5-1 having the emitter follower circuit as an output circuit.

The laser diode LD1 may be formed with, for example, InP-type material. Carrier light (input light) which is emitted from the laser diode LD1 and directed into the EA type optical modulator 6-1, is modulated by the drive voltage applied by the driver circuit 5-1, so that the output light (modulated light) is emitted.

Figure 9:
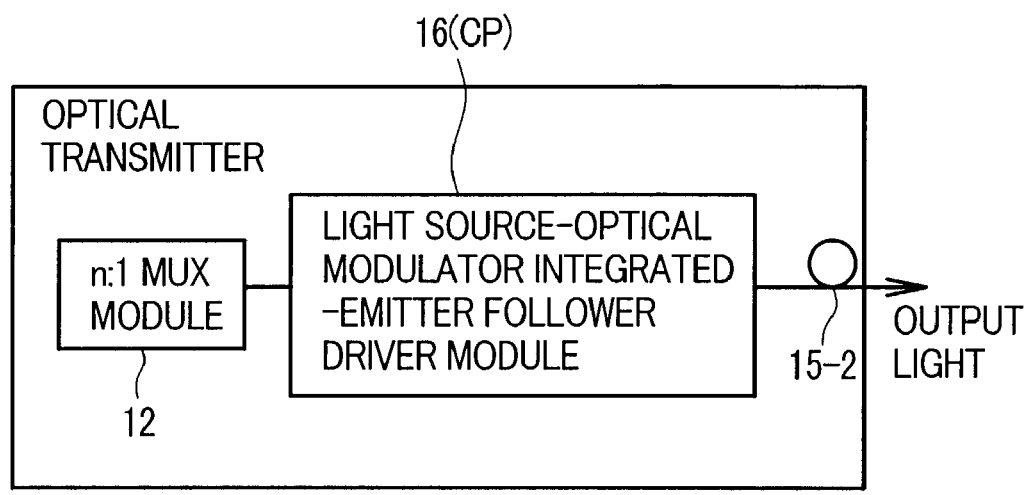
FIG. 9 is a functional block diagram illustrating an entire configuration of the optical transmitter according to the third embodiment of the present invention.

FIG. 9 illustrates a light source-optical modulator integrated-emitter follower driver module 16 integrated into the chip CP (indicated as reference numeral 16 (CP) in FIG. 9) as described in FIG. 8 and a multiple circuit (MUX: Multiplexer) module 12. An electric signal from the MUX module 12 with n:1 multiple is inputted into the module 16 (CP) of the present embodiment, and thereby carrier light from the light source is modulated and outputted to the outside via optical fiber 15-2.

Figure 10:
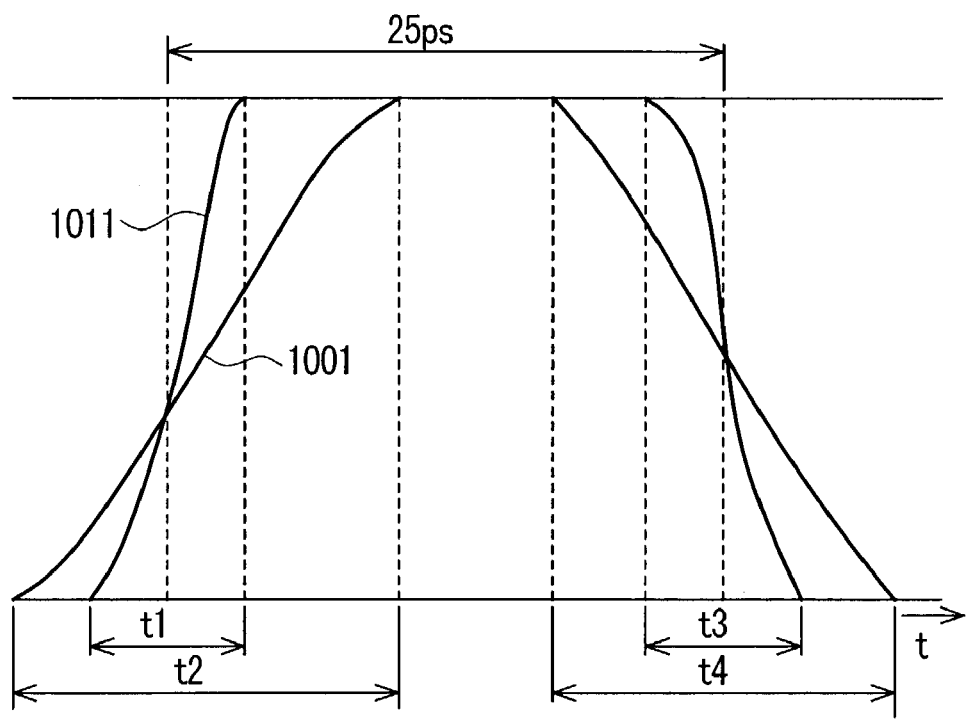
FIG. 10 is a view illustrating an example of a high-speed operating waveform by the optical transmitter of FIG. 9. In addition, this figure illustrates a high-speed operating waveform by a general optical transmitter.

FIG. 10 is a view illustrating an example of operating waveform obtained by use of the module of FIG. 9. As shown in FIG. 10, an operating waveform 1011 obtained by the module of the present embodiment has a rising time t1 and a falling time t3 and the sum of t1 and t3 is almost 5 ps. This is smaller than the changeover period (25 ps) between "0" and "1," and it is understood that the module performs normally. In contrast, when a conventional circuit is used, a waveform 1001 having a rising time t2 and a falling time t4 was obtained and the sum of them was almost 20 ps. This figure is nearly the same as the period (25 ps), and thus it is difficult to identify "0" and "1." In this way, if the operating frequency f is approximately 50 GHz, the module of the present embodiment is very advantageous even when the other conditions are same.

Figure 11:
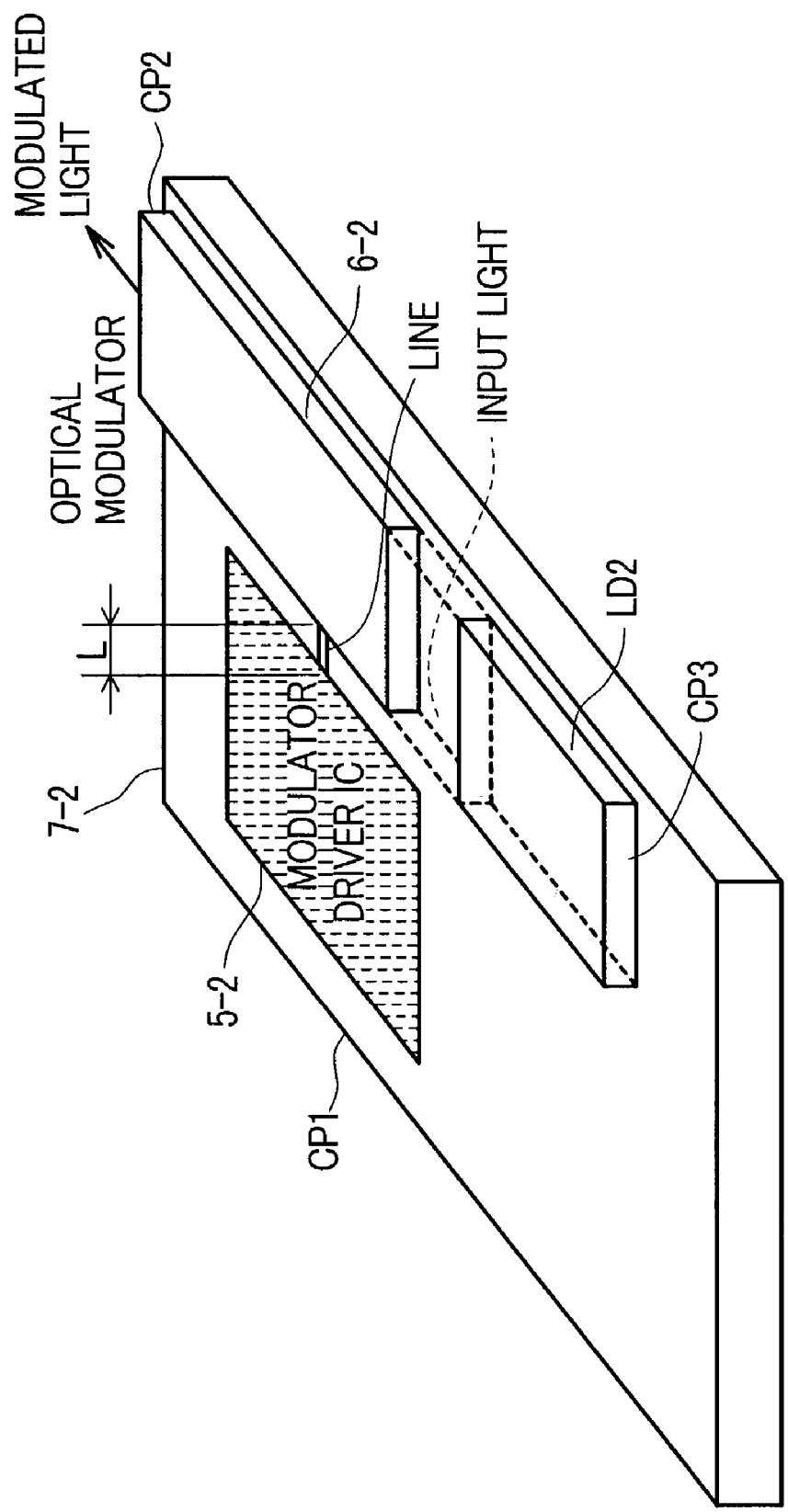
FIG. 11 is a perspective view of an optical transmitter according to a fourth embodiment of the present invention.
Figure 12:
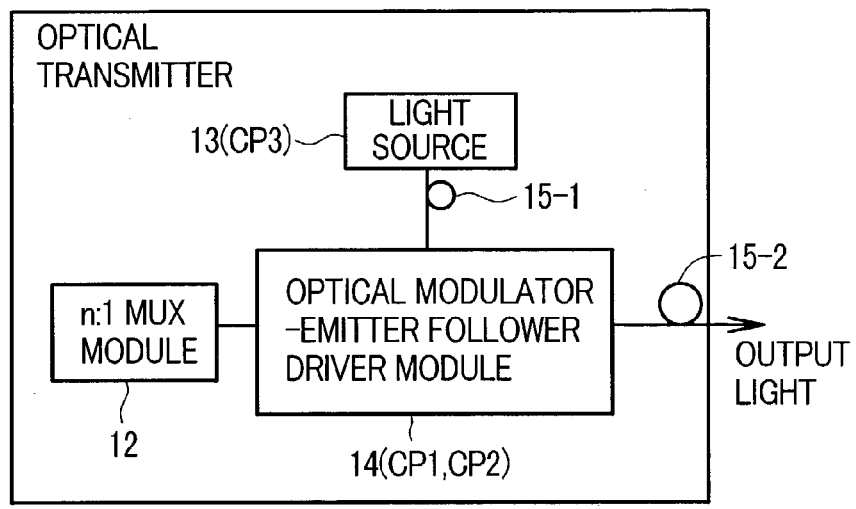
FIG. 12 is a functional block diagram illustrating an entire configuration of the optical transmitter according to the fourth embodiment of the present invention.

Next, an optical transmitter according to a fifth embodiment of the present invention is described by referring to FIGS. 11 and 12. FIG. 11 corresponds to FIG. 3, and in addition to the optical transmitter described in FIG. 3, a chip CP2 having an optical modulator 6-2 and a chip CP3 having a laser diode LD2 that emits carrier light, are mounted on the chip CP1 having the driver circuit 5-2 with the emitter follower circuit as an output circuit.

Carrier light (input light), which is emitted from the laser diode LD2 and directed into the EA type optical modulator 6-2 through waveguide, is modulated by the drive voltage applied by driver circuit 5-2, so that output light (modulated light) is emitted.

FIG. 12 illustrates the optical modulator integrated-emitter follower driver module 14 (CP1 and CP2) described in FIG. 11, light source 13 (CP3), optical fiber 15-1 which combines the optical modulator integrated-emitter follower driver module 14 (CP1 and CP2) with the light source 13 (CP3), and a multiple circuit (MUX: Multiplexer) module 12. An electric signal from MUX module 12 with n:1 multiple is inputted into the module of the present embodiment, and thereby carrier light from the light source is modulated and outputted to the outside via optical fiber 15-2. Each element is prepared on separate chip, and this permits the selection of chips suitable according to individual properties, thereby enabling an optical transmitter as a whole to exhibit high performance.

Incidentally, in the optical transmitter of the present embodiment, the multiple circuit (MUX:Multiplexer) module 12 may be integrated into the same chip as CP1.

Figure 13:
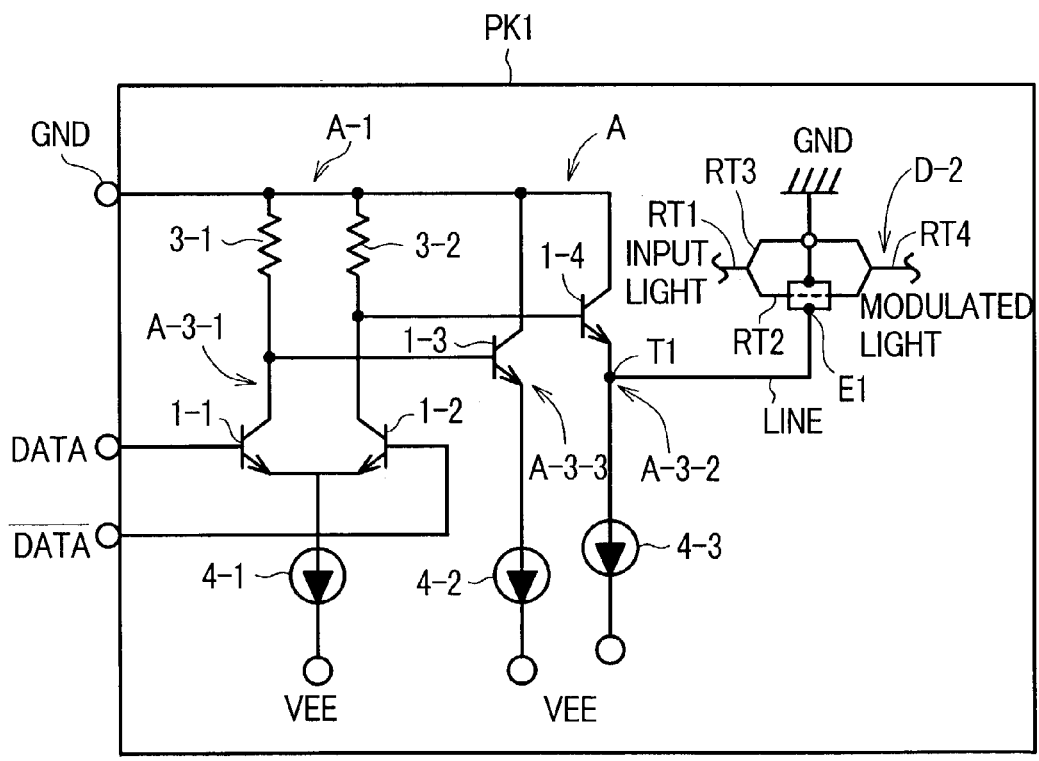
FIG. 13 is a circuit diagram illustrating a modification of the optical transmitter according to all the embodiments of the present invention.

A modification example of the optical transmitter according to the first to fifth embodiments of the present invention is described with reference to FIG. 13. FIG. 13 illustrates an optical transmitter which basically has the same configuration as the optical transmitters of the first to fifth embodiments. However, different from the previous embodiments, Mach-Zehnder optical modulator D-2 is used as the optical transmitter instead of EA type optical modulator. Mach-Zehnder optical modulator D-2 has, for example, a first waveguide RT1, a guiding branch for branching the first waveguide into a second and third waveguide RT2 and RT3, and a fourth waveguide RT4 which is formed by merging the second waveguide RT2 with the third waveguide RT3. Through the fourth waveguide, light is emitted.

For example, an electrode E1 for applying voltage from output stage of the driver circuit A-1 is formed toward the second waveguide RT2. The drive voltage applied from the driver circuit A-1 allows light phase passing through the second waveguide RT2 to be modulated. The degree of modulation on the light phase is adjusted by the drive voltage applied from the driver circuit A-1. The light phase passing through the third waveguide RT3 is not modulated. Therefore, when the light passing through the second waveguide RT2 and the light passing through the third waveguide RT3 are merged and emitted in the fourth waveguide RT4, the emitted light has a phase different from the input light.

When Mach-Zehnder optical modulator is used instead of the EA type optical modulator, an emitter follower-type output circuit may also be used as the output circuit of the driver circuit for applying voltage to electrode E1. This allows the maximum operating frequency fm of the optical transmitter to be increased almost independently from the capacitance C of the Mach-Zehnder optical modulator.

In this case, the arrangement of the driver circuit and optical modulator is required to have a short distance therebetween so that it can be regarded as a lumped constant even at high frequencies.

Other configurations and applications for the modification example are the same as described in the first to fifth embodiments.

While the present invention have been described above with reference to the embodiments thereof, the prevent invention is not limited to these embodiments. It is also obvious to those skilled in the art that various modifications, improvements, and combinations are possible.

Use of an emitter follower circuit as an output of a driver circuit for an optical modulator allows the optical modulator to perform high-speed operations without frequency restriction due to a CR time constant. Integration of the driver circuit and optical modulator on the same substrate enables further high-speed performance and higher integration.

All publications, patents and patent applications cited herein are incorporated herein by reference in their entirety.

What is claimed is:

1. An optical transmitter comprising:
   an optical modulator which modulates and outputs an input light in accordance with an applied drive voltage; and
   a driver circuit which outputs the applied voltage into the optical modulator and has an emitter follower circuit at an output stage thereof,
   wherein the length (L) of a wiring between an output terminal of the emitter follower circuit and a voltage input terminal of the optical modulator has such an equal or shorter distance, in terms of maximum operating frequency (fm) of the optical transmitter, wherein the driver circuit and the optical modulator can be handled in a lumped constant manner.

2. The optical transmitter according to claim 1, wherein the length (L) is represented by the following equation (1):

$$L = (\mu_0 \epsilon_0 \epsilon_s)^{-0.5} / fm \qquad (1)$$

wherein $\mu_0$ is a space permeability, $\epsilon_0$ is a dielectric constant, and $\epsilon_s$ is an effective specific inductive capacity of a material surrounding the wiring between the output terminal of the emitter follower circuit and the voltage input terminal of the optical modulator.

3. An optical transmitter comprising:
   a substrate;
   an optical modulator formed in the substrate, which intensity-modulates and outputs an input light in accordance with an applied drive voltage; and
   a driver circuit formed in the substrate, which outputs the drive voltage into the optical modulator and has an emitter follower circuit at an output stage of the driver circuit,
   wherein the interval (L) between an output terminal of the emitter follower circuit and a voltage input terminal of the optical modulator is equal to or shorter than the distance which is regarded as a lumped constant in terms of the maximum operating frequency (fm) of the optical transmitter.

4. An optical transmitter comprising:
   a substrate;
   an optical modulator mounted on the substrate in the form of a chip, which modulates and outputs an input light in accordance with an applied drive voltage; and
   a driver circuit formed on the substrate, which outputs the drive voltage into the optical modulator and has an emitter follower circuit at an output stage of the drive circuit,
   wherein the interval (L) between an output terminal of the emitter follower circuit and a voltage input terminal of the optical modulator is equal to or shorter than the distance which is regarded as a lumped constant in terms of the maximum operating frequency (fm) of the optical transmitter.

* * * * *